United States Patent
Yamaguchi et al.

(10) Patent No.: US 12,545,203 B2
(45) Date of Patent: Feb. 10, 2026

(54) SERVER

(71) Applicant: TOYOTA JIDOSHA KABUSHIKI KAISHA, Toyota (JP)

(72) Inventors: Tomonari Yamaguchi, Miyoshi (JP); Masanori Kushibe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 18/417,292

(22) Filed: Jan. 19, 2024

(65) Prior Publication Data
US 2024/0300431 A1  Sep. 12, 2024

(30) Foreign Application Priority Data
Mar. 10, 2023 (JP) .................. 2023-037355

(51) Int. Cl.
| | |
|---|---|
| *B60R 16/037* | (2006.01) |
| *G06F 21/31* | (2013.01) |
| *G07C 5/00* | (2006.01) |
| *H04L 67/12* | (2022.01) |
| *H04L 67/563* | (2022.01) |

(52) U.S. Cl.
CPC ............ *B60R 16/037* (2013.01); *G06F 21/31* (2013.01); *G07C 5/008* (2013.01)

(58) Field of Classification Search
CPC ....... B60R 16/037; G06F 21/31; G07C 5/008; H04L 67/12; H04L 67/563; H04L 67/5683

USPC ............................................................ 701/2
See application file for complete search history.

(56) References Cited

U.S. PATENT DOCUMENTS

| | | | |
|---|---|---|---|
| 2017/0195166 A1* | 7/2017 | Keerthi ............ | G08G 1/096811 |
| 2019/0315297 A1* | 10/2019 | Yamada ................ | B60W 50/08 |
| 2020/0062269 A1* | 2/2020 | Vardharajan ...... | B60W 50/0098 |
| 2022/0204011 A1 | 6/2022 | Sugimoto et al. | |
| 2024/0022904 A1 | 1/2024 | Komine et al. | |
| 2024/0300431 A1* | 9/2024 | Yamaguchi ............. | G06F 21/31 |

FOREIGN PATENT DOCUMENTS

| | | |
|---|---|---|
| JP | 2019-034684 A | 3/2019 |
| JP | 2020-158003 A | 10/2020 |
| JP | 2022-101105 A | 7/2022 |
| WO | 2022/129970 A1 | 6/2022 |

* cited by examiner

*Primary Examiner* — Tyler D Paige
(74) *Attorney, Agent, or Firm* — SoraIP, Inc.

(57) ABSTRACT

The server includes a storage device and a processing device. The storage device is configured to store user setting information that is setting information for each device of a plurality of vehicles associated with a user. The processing device is configured to perform a recording process and a transmission process. The first vehicle includes a storage unit that stores local setting information set in the first vehicle for a device of the first vehicle. The recording process includes a process of recording local setting information as user setting information in the storage device in response to a request from the user. The transmission process includes a process of transmitting the recorded user setting information to the second vehicle in response to a request from the second vehicle.

9 Claims, 6 Drawing Sheets

SERVER

CROSS-REFERENCE TO RELATED APPLICATION

This application claims priority to Japanese Patent Application No. 2023-037355 filed on Mar. 10, 2023, incorporated herein by reference in its entirety.

BACKGROUND

1. Technical Field

The present disclosure relates to a server.

2. Description of Related Art

Japanese Unexamined Patent Application Publication No. 2020-158003 (JP 2020-158003 A) discloses a vehicle setting inheritance system. This system learns characteristic information (setting information) of a user in a first vehicle, and causes a second vehicle, which is another vehicle, to inherit the characteristic information obtained through the learning.

SUMMARY

Connected technology related to a vehicle is attracting attention. According to such technology, a server communicates with a plurality of vehicles and exchanges various kinds of information with each vehicle.

Each vehicle can include various devices such as an audio device, a car navigation device, or an air conditioner. A technique is known in which information on user settings for the device (user setting information) is recorded on a server, and the server transmits (distributes) this information to a vehicle in response to a request. Although it is preferable that the user setting information recorded on the server reflect the user's preferences, creating such user setting information may be time consuming.

The present disclosure has been made in order to solve the above problems, and an object of the present disclosure is to provide a server that reduces the time required to create the user setting information that reflects the user's preferences.

A server according to the present disclosure communicates with a plurality of vehicles including a first vehicle and a second vehicle. The server includes a storage device and a processing device. The storage device is configured to store user setting information that is setting information for a device of each of the vehicles, the user setting information being associated with a user of the first vehicle. The processing device is configured to execute a recording process and a transmission process. The first vehicle includes a storage unit that stores local setting information set in the first vehicle for a device of the first vehicle. The recording process includes a process of recording the local setting information as the user setting information in the storage device in response to a first request from the user. The transmission process includes a process of transmitting the recorded user setting information to the second vehicle in response to a second request from the second vehicle.

According to the present disclosure, it is possible to reduce the work time required to create the user setting information that reflects the user's preferences.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings. Identical or corresponding parts in the figures are designated by the same reference numerals, and their descriptions will not be repeated. The embodiments and their variations may be combined with each other as appropriate.

Figure 1:
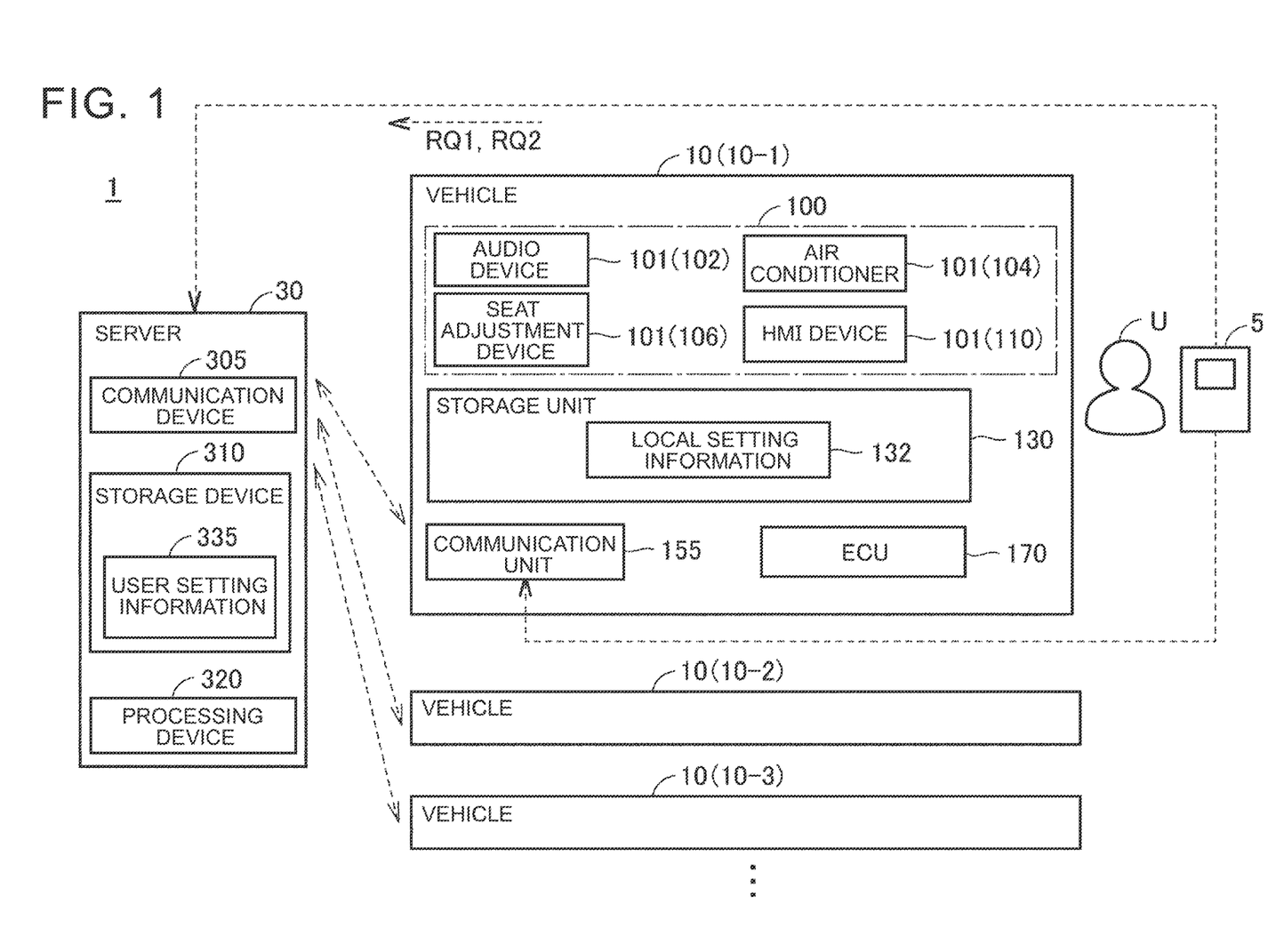
FIG. 1 is a diagram illustrating the overall configuration of an information processing system including a server.

FIG. 1 is a diagram illustrating the overall configuration of an information processing system including a server according to an embodiment of the present disclosure. Referring to FIG. 1, information processing system 1 includes a mobile terminal 5, a plurality of vehicles 10, and a server 30.

The mobile terminal 5 is, for example, a smartphone, and is operated by the user U. The mobile terminal 5 displays various screens on its display, performs short-range communication with the vehicle 10, and communicates wirelessly with the server 30. The mobile terminal 5 stores identification (ID) information of the user U and ID information of the mobile terminal 5. The user U inputs identification information such as a password into the mobile terminal 5 in order to apply to the server 30 to create an account for himself/herself using the mobile terminal 5. The mobile terminal 5 transmits the identification information to the server 30. The server 30 verifies the validity of the user U according to the identity verification information, and allows the user U to create an account after successful identity verification. This allows user U to create his or her own account and log into the account.

The plurality of vehicles 10 includes vehicles 10-1, 10-2, and 10-3. Vehicle 10-1 is owned by user U and is usually used. Vehicle 10-1 may be shared by user U and his family (not shown). It is assumed that the vehicle 10-2 is, for example, a rental car and is scheduled to be used by the user U. It is assumed that the vehicle 10-3 is, for example, a rental car and has been used by the user U in the past. In this example, it is assumed that the vehicles 10-1, 10-2, and 10-3 are of the same model.

Each vehicle 10 includes devices 100, a storage unit 130, a communication unit 155, and an Electronic Control Unit ECU 170.

The devices 100 include a plurality of devices 101. The plurality of devices 101 includes an audio device 102, an air conditioner 104, a seat adjustment device 106, and an HMI device 110.

Audio device 102 reproduces various sounds. Air conditioner 104 adjusts the temperature of a vehicle cabin the vehicle 10. Seat adjustment device 106 adjusts the position of the seat of vehicle 10.

The HMI device 110 is, for example, a touch screen, and receives various user operations and displays various screens. The HMI device 110 can perform a car navigation function to guide the user U by displaying the location of the destination of the vehicle 10 on a map image. The above user operations include an operation of setting at least one of the volume setting of the audio device 102, the setting position of the favorite spot of the car navigation function of the vehicle 10, the setting position of the destination of the car navigation function of the vehicle 10, the setting temperature of the air conditioner 104, and the setting position of the seat of the vehicle 10.

The storage unit 130 stores local setting information 132. The local setting information 132 is information that is locally set in the vehicle 10 for the device 101 of the vehicle 10, and includes information indicating the results of the various setting operations described above. For example, the local setting information 132 includes at least one pieces of information indicating the volume setting of the audio device 102 of the vehicle 10-1, information indicating the setting position of a favorite spot of the car navigation function of the vehicle 10-1, information indicating the history of the setting position of the destination of the car navigation function of the vehicle 10-1, information indicating the temperature setting of the air conditioner 104 of the vehicle 10-1, and information indicating the setting position of the seat of the vehicle 10-1.

The communication unit 155 performs wireless communication with the server 30 and short-range communication with the mobile terminal 5. ECU 170 controls each device 101 and communication unit 155.

The mode of each vehicle 10 includes a user mode. The user mode is a mode in which the user U is authenticated (identified) in the vehicle 10. In order to set the mode of the vehicle 10 to the user mode, it is necessary to create an account for the user U and to make the user U a registered user of the vehicle 10.

User U uses the HMI device 110 to perform an operation to make himself a registered user. In response to this operation, the HMI device 110 displays a Quick Response (QR) code (registered trademark) on its screen. After logging into his own account using the mobile terminal 5, the user U causes the mobile terminal 5 to scan the QR code. The mobile terminal 5 transmits a request RQ1 to the server 30 in response to scanning the QR code. Request RQ1 is a signal requesting server 30 to make user U a registered user of vehicle 10, and includes ID information of user U and ID information of vehicle 10.

In response to receiving the request RQ1, the server 30 transmits an access token to the vehicle 10 identified by the ID information of the vehicle 10. When ECU 170 of vehicle 10 receives the token through communication unit 155, bidirectional communication between vehicle 10 and server 30 becomes possible, and vehicle 10 is synchronized with server 30. Then, the user U is registered in the vehicle 10, and the server 30 is notified from the vehicle 10 that the user U has become a registered user of the vehicle 10. Thereafter, the user U is managed by the server 30 as a registered user of the vehicle 10. The user U is also notified through the screen display of the HMI device 110 that the user U has become a registered user. Up to n users may be registered in each vehicle 10 (in this example, n=3). The vehicle 10 in which the user U has already been registered is also referred to as a "user registered vehicle."

The user mode is set when the user U is authenticated by the ECU 170 of the user-registered vehicle. Authentication of the user U is achieved, for example, based on the ID information of the user U transmitted from the mobile terminal 5 to the user's registered vehicle through short-range communication.

When the user U is successfully authenticated, the user registered vehicle transmits a request RQ2 to the server 30, thereby being able to acquire user setting information 335 (described later) from the server 30. Request RQ2 includes ID information of user U and ID information of the user's registered vehicle.

The mode of vehicle 10-1 further includes a guest mode. The guest mode is a mode in which the user U is not authenticated (specified) in the vehicle 10-1. The guest mode can be set even if the user U has not created an account or is not authenticated because the user U is not carrying the mobile terminal 5 when using the vehicle 10. Guest mode can be set to use common settings when vehicle 10-1 is shared by user U and his family. A user who uses the vehicle 10-1 during guest mode is also referred to as a "guest user." In this example, the guest user is user U or his family. The mode of vehicle 10-1 is set using HMI device 110 of vehicle 10-1.

Server 30 includes a communication device 305, a storage device 310, and a processing device 320. Communication device 305 is configured to communicate with multiple vehicles 10.

Storage device 310 includes Read Only Memory (ROM) and Random Access Memory (RAM) (both not shown). The ROM stores various programs. The storage device 310 stores user setting information 335. The user setting information 335 is setting information of the device 101 of each vehicle 10 associated with the user U (specifically, the user U's account).

Processing device 320 includes a Central Processing Unit (CPU). The CPU executes various calculation processes by executing programs stored in the ROM. Processing device 320 can transmit user setting information 335 to vehicle 10 via communication device 305.

After receiving the user setting information 335, the ECU 170 controls each device 101 according to the user setting information 335. As a result, the user U's settings for each device 101 in the vehicle 10 (for example, the set volume of the audio device 102, the set position of a favorite spot, the history of the set position of a destination, the set temperature of the air conditioner 104, or the set position of the seat) is automatically reproduced.

The server 30 thus provides the user U with a service for automatically reproducing the user U's settings in each vehicle 10 using the user setting information 335. This service is also referred to as a "user settings reproduction service."

Figure 2:
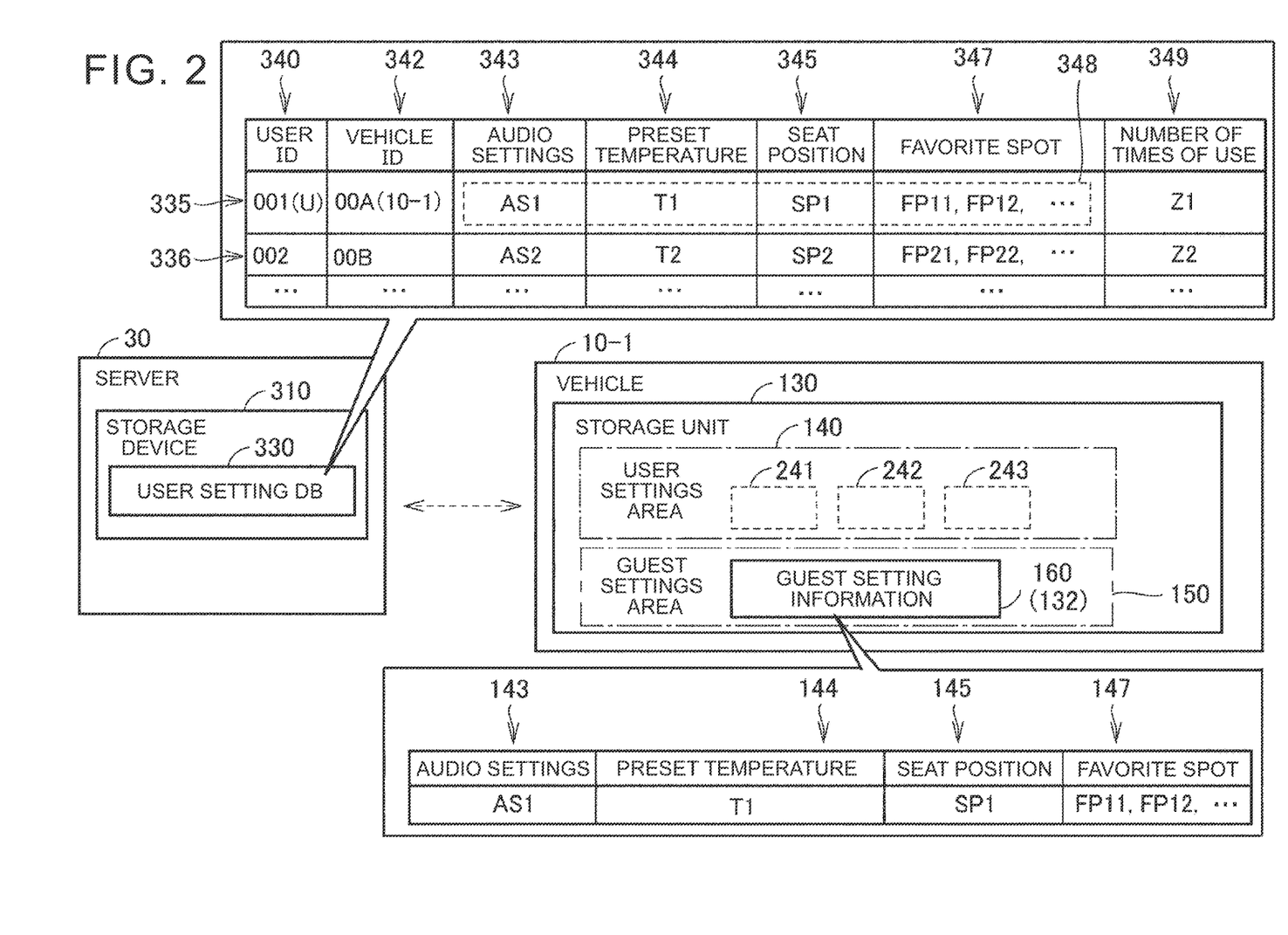
FIG. 2 is a diagram illustrating the data structure of user setting information and local setting information.

FIG. 2 is a diagram illustrating the data structure of the user setting information 335 and the local setting information 132. Referring to FIG. 2, the storage device 310 of the server 30 includes a user setting database (DB) 330. User setting DB 330 includes user setting information 335 and 336.

Each of the user setting information 335 and 336 is associated with the account of the corresponding user, and includes user ID information 340, vehicle ID information 342, audio setting information 343, temperature setting information 344, seat position information 345, favorite spot information 347 and information on number of times of use 349.

User ID information 340 is used to identify the corresponding user for each of user setting information 335 and 336. Regarding the user setting information 335, the corresponding user is user U. Vehicle ID information 342 is used to identify the user-registered vehicle of the corresponding user. Regarding the user setting information 335, the user registered vehicle is, for example, vehicle 10-1.

The audio setting information 343 indicates the set volume of the audio device 102 associated with the corresponding user. The temperature setting information 344 indicates the temperature setting of the air conditioner 104 associated with the corresponding user. Seat position information 345 indicates the seat position associated with the corresponding user. Favorite spot information 347 indicates favorite spots associated with the corresponding user. Audio setting information 343, temperature setting information 344, seat position information 345, and favorite spot information 347 are also expressed as setting information 348. Setting information 348 indicates setting information of each device 101.

The information on number of times of use 349 indicates the number of times the corresponding user used the user setting reproduction service. This number of times is, for example, the number of times the server 30 has received the request RQ2. In the embodiment, it is assumed that this number of times is zero (that is, user U has never used the user setting reproduction service), and user U is not a registered user of any vehicle 10 other than vehicle 10-1.

Each of the user setting information 335 and 336 may further include information (not shown) indicating a history of destination setting positions associated with the corresponding user.

Storage unit 130 of vehicle 10-1 includes a user setting area 140 and a guest setting area 150. User setting area 140 includes areas 232, 233, and 234 for storing user setting information of n registered users (n=3 in this example).

The guest setting area 150 stores guest setting information 160. The guest setting information 160 is setting information of the device 101 of the vehicle 10-1 while the vehicle 10-1 is in the guest mode. Guest setting information 160 is set by a guest user using HMI device 110 and is included in local setting information 132.

The guest setting information 160 includes audio setting information 143, temperature setting information 144, seat position information 145, and favorite spot information 147. The audio setting information 143 indicates the set volume of the audio device 102 of the vehicle 10-1 set by the guest user. The temperature setting information 144 indicates the temperature setting of the air conditioner 104 of the vehicle 10-1 set by the guest user. Seat position information 145 indicates the seat position set by the guest user. Favorite spot information 147 indicates the favorite spot of vehicle 10-1 set by the guest user.

Although user setting information 335 preferably reflects user U's preferences, creating such user setting information 335 may take a lot of time.

For example, the user U can customize the settings of the device 101 of the vehicle 10-1 as desired, and record information on the customized settings on the server 30 as the user setting information 335. As a result, even if the user U uses a vehicle different from the vehicle 10-1 (in this example, the vehicle 10-2), the server 30 transmits the user setting information 335 to the vehicle 10-2 in response to the request RQ2 (FIG. 1). As a result, preferred user settings can be automatically reproduced in the vehicle 10-2 as well.

If the user U desires to newly record user setting information 335 on the server 30, default setting information prepared in advance on the server 30 may be used as the initial user setting information 335. However, the default setting information may not reflect user U's preferences. In this case, the user U is required to change the default setting information (for example, using the HMI device 110 or the mobile terminal 5) in order to create the user setting information 335 that reflects his or her preferences. As a result, a lot of working time is wasted.

In order to deal with such problems, the server 30 (specifically, the processing device 320) according to the embodiment is configured to execute the recording process described below. The recording process corresponds to a process of recording local setting information 132 of vehicle 10-1 in storage device 310 of server 30 as user setting information 335, in response to request RQ1 from user U (in this example, at the time of user registration of vehicle 10-1), Specifically, this process is a process of recording a copy of the local setting information 132 as the setting information 348 of the user setting information 335.

Server 30 is further configured to perform transmission processing. The transmission process corresponds to the process of transmitting the user setting information 335 recorded in the storage device 310 to the vehicle 10-2 in response to the request RQ2 from the vehicle 10-2 (in this example, after the user authentication of the vehicle 10-2 is completed).

If user U (and his family) has been using the vehicle 10-1 for a long time under the local settings of the vehicle 10-1 without creating an account, the local setting information 132 may better reflect the user U's preferences than the default setting information described above. In this case, the local setting information 132 is more suitable as the user setting information 335 than the default initial setting information.

According to the recording process, the local setting information 132 is automatically recorded on the server 30 as the user setting information 335. Thereby, user U's preferences are reflected in user setting information 335 from the beginning. Therefore, It is not necessarily necessary to perform work to change the default setting information as the initial user setting information 335 in order to record the user setting information 335 that reflects the own preferences on the server 30, after the user U creates his own account and becomes a registered user of the vehicle 10-1. As a result, such working time can be reduced (preferably made unnecessary). Furthermore, according to the transmission process, the user setting information 335 recorded in the server 30 as described above is transmitted to the vehicle 10-2. Thereby, the user settings that reflect user U's preferences can be automatically reproduced in vehicle 10-2 (inherited to vehicle 10-2). Therefore, user U's convenience can be improved.

In the embodiment, local settings information 132 is guest settings information 160. When vehicle 10-1 is shared by multiple people, such as a user and his or her family, the guest mode of vehicle 10-1 may be used frequently. Therefore, it is highly likely that the guest setting information 160 already reflects user U's preferences. In this example, guest setting information 160 is recorded in server 30 as user setting information 335, and this user setting information 335 is transmitted to vehicle 10-2. Thereby, the guest settings of the vehicle 10-1 can be automatically reproduced (inherited) in the vehicle 10-2.

Figure 3:
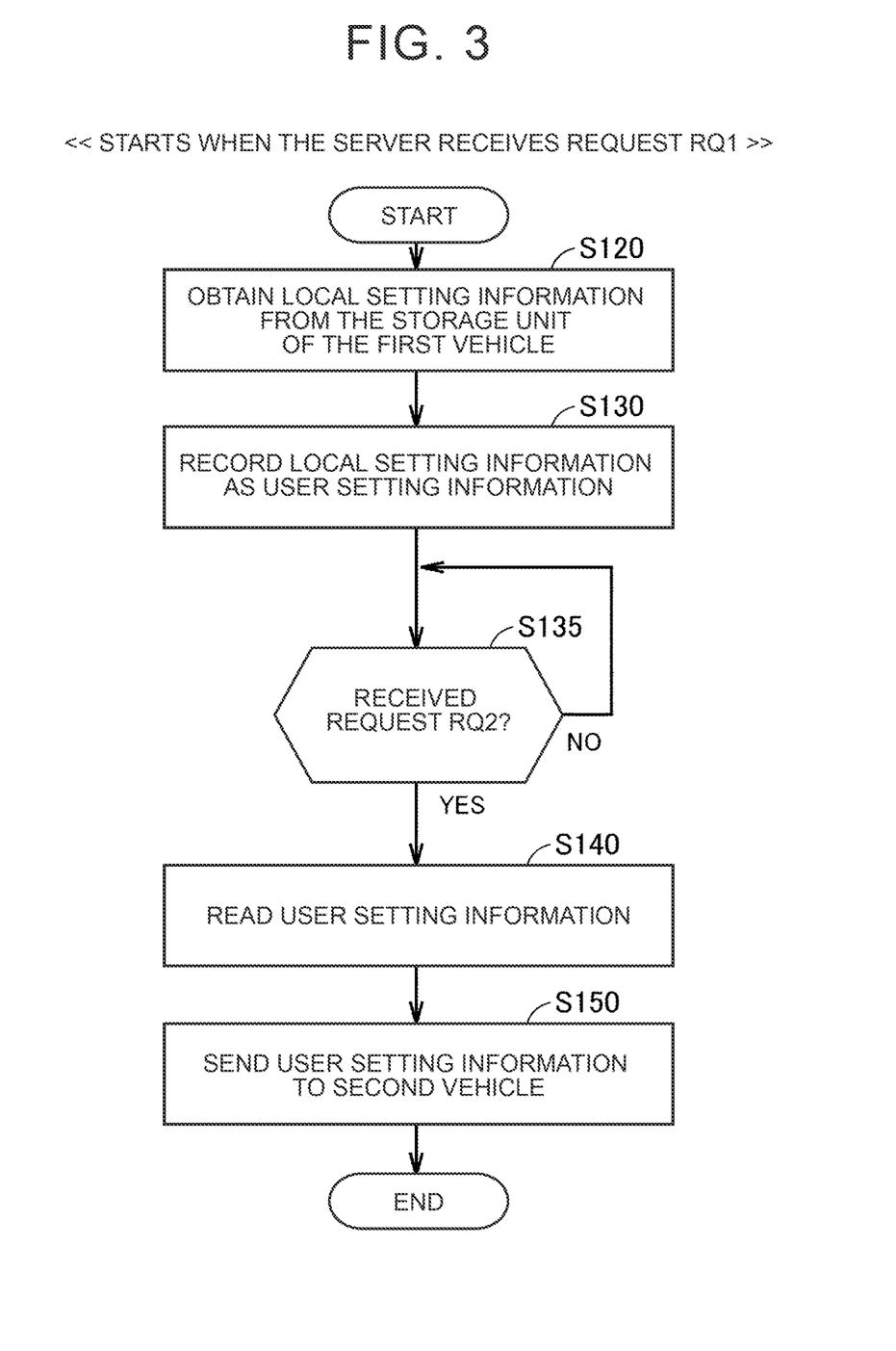
FIG. 3 is a flowchart illustrating processing performed by the server.

FIG. 3 is a flowchart illustrating processing executed by the server 30 (specifically, the processing device 320) according to the embodiment. This flowchart starts when the server 30 receives the request RQ1 at the time of user registration of the vehicle 10-1. Hereinafter, step will be abbreviated as "S".

Referring to FIG. 3, server 30 acquires local setting information 132 (guest setting information 160) from storage unit 130 of vehicle 10-1 (first vehicle) (S120). The server 30 records the local setting information 132 as the user setting information 335 in the storage device 310 (S130).

The server 30 determines whether the request RQ2 has been received (S135). If the server 30 has not yet received the request RQ2 (NO in S135), it repeats this determination process until it receives the request RQ2.

When the server 30 receives the request RQ2 (YES in S135), the server 30 reads the user setting information 335 from the user setting DB 330 according to the ID information of the user U included in the request RQ2 and the user ID information 340 of the user setting DB 330 (S140). In this example, the user setting information 335 is recorded based on the local setting information 132 in S130. The server 30 transmits the read user setting information 335 to the vehicle 10-2 (second vehicle) (S150).

As described above, according to the embodiment, the guest settings of vehicle 10-1 can be automatically reproduced in vehicle 10-2.

First Modification

In the embodiment, the number of times (Z1) indicated by the information on number of times of use 349 (FIG. 2) is zero (that is, the user U has never used the user setting reproduction service), and it is assumed that the user U is not a registered user of the vehicle 10 other than the vehicle 10-1. In this modification example 1, the number of times is non-zero (that is, user U has used the user setting reproduction service before), and user U is already a registered user of a vehicle 10 other than vehicle 10-1.

This modification 1 is the same as the embodiment in that the server 30 is configured to be able to record local setting information 132 as user setting information 335 in the storage device 310. On the other hand, this modification 1 is different from the embodiment in the point that the server 30 (specifically, the storage device 310) stores past setting information as the user setting information 335 that was recorded before the local setting information 132 was recorded.

Figure 4:
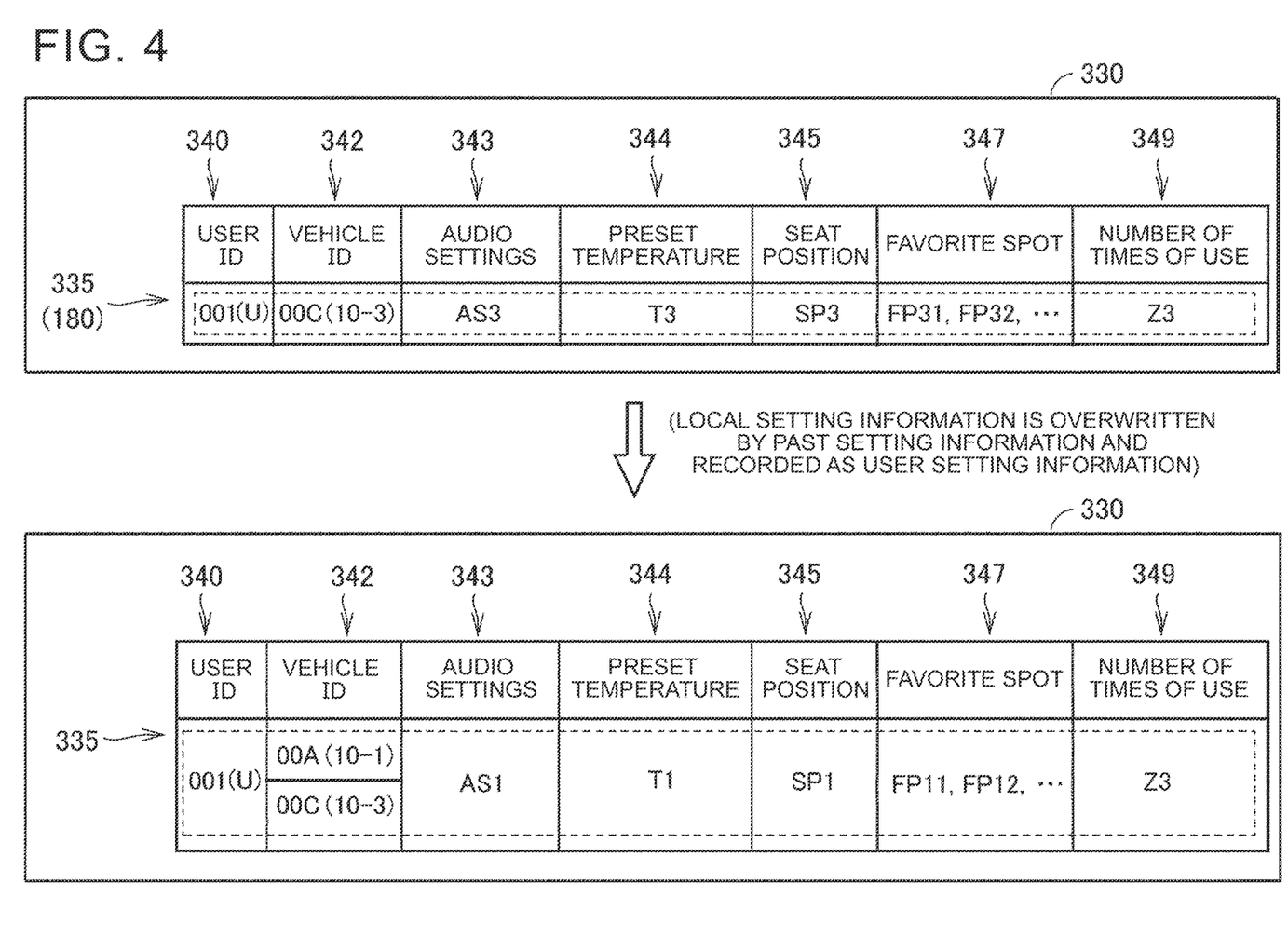
FIG. 4 is a diagram for explaining processing according to modification example 1.

FIG. 4 is a diagram for explaining the processing of the server 30 according to the first modification. Referring to FIG. 4, past setting information 180 is included in user setting DB 330. In this example, it is assumed that the number of times (Z3) indicated by the information on number of times of use 349 is non-zero, and the user U is already a registered user of a vehicle 10 other than vehicle 10-1 (for example, vehicle 10-3).

Preferably, suitable user setting information 335 is recorded in the server 30 when registering the user of the vehicle 10-1. It is considered that the past setting information 180 reflects the preferences of the user U when the user U used the vehicle 10-3 in the past. On the other hand, as described in the above embodiment, the local setting information 132 of the vehicle 10-1 may also be suitable as the user setting information 335. The question is whether local setting information 132 or past setting information 180 is more suitable for user U.

The server 30 according to the first modification is configured to perform inquiry processing and determination processing in addition to recording processing and transmission processing.

The inquiry process corresponds to a process for inquiring the user U which of the local setting information 132 or the past setting information 180 should be determined (selected) as the user setting information 335. In detail, the inquiry processing corresponds to processing for transmitting an inquiry signal for making such an inquiry to the vehicle 10 (for example, the vehicle 10-1).

The determination process corresponds to a process of determining either the local setting information 132 or the past setting information 180 as the user setting information 335 according to the result of the inquiry process. For example, as a result of the inquiry, if the user U answers that he prefers the local setting information 132 over the past setting information 180, the local setting information 132 is determined as the user setting information 335. The local setting information 132 is then overwritten over the past setting information 180 and recorded as user setting information 335 (see FIG. 4). On the other hand, if the user U answers that he prefers the past setting information 180 to the local setting information 132, the past setting information 180 is determined as the user setting information 335. The past setting information 180 is maintained as the user setting information 335, and the local setting information 132 is not used as the user setting information 335. After the user U answers, the user setting information 335 may be sent to registered vehicle from the server 30 to the user regardless of whether the user U uses the vehicle 10-1 or 10-3 (both are user-registered vehicles).

According to the inquiry process and the determination process, which of the local setting information 132 or the past setting information 180 should be determined as the user setting information 335 after the inquiry process is determined depending on the user's intention. Thereby, the user setting information 335 can be made more suitable.

Figure 5:
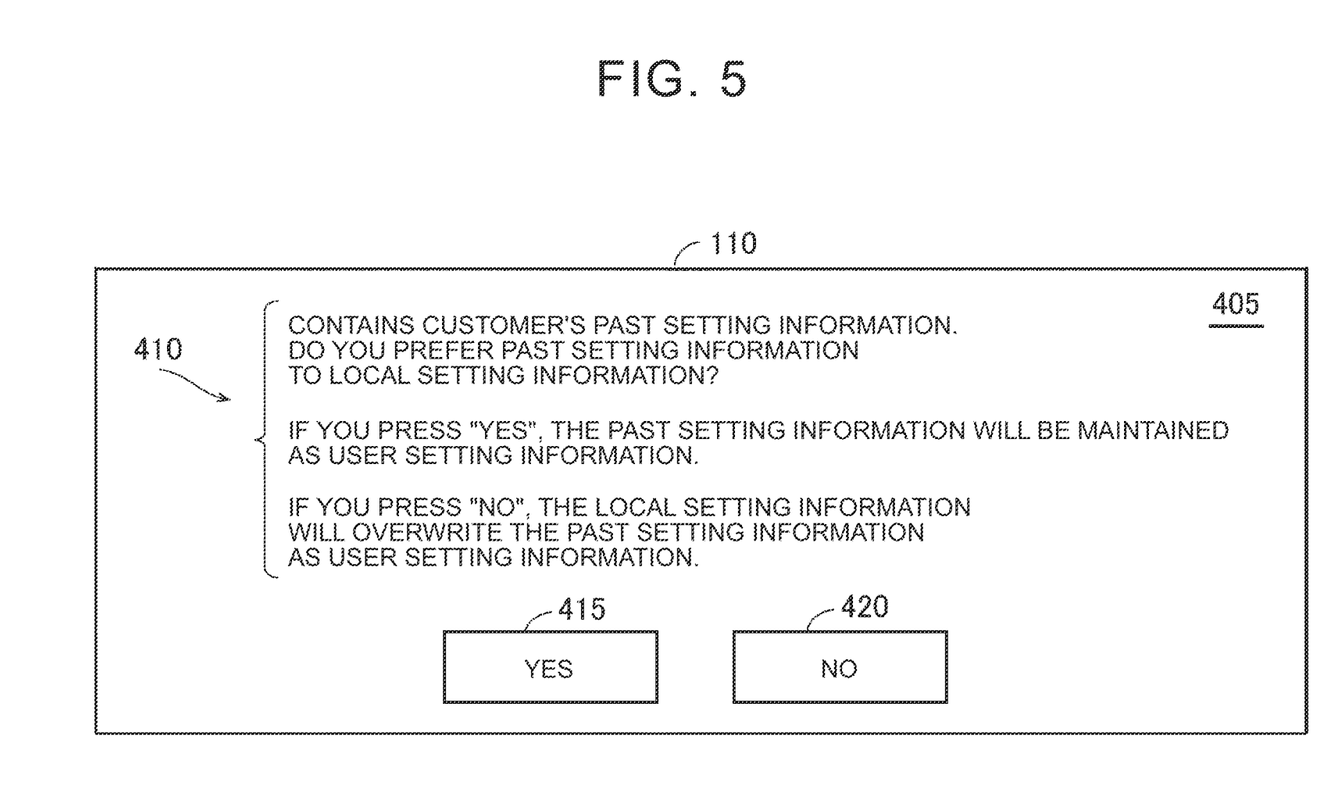
FIG. 5 is a diagram illustrating a screen displayed on a Human Machine Interface (HMI) device.

FIG. 5 is a diagram illustrating a screen displayed on the HMI device 110 during inquiry processing. Referring to FIG. 5, screen 405 is displayed in response to receiving an inquiry signal from server 30 and includes a message 410 and buttons 415 and 420.

Message 410 asks user U whether he prefers past setting information 180 to local setting information 132. Button 415 is operated when user U gives a first answer that he prefers past setting information 180 to local setting information 132. When the button 415 is operated, the ECU 170 transmits a first answer signal indicating the first answer to the server 30 through the communication unit 155. The button 420 is operated when the user U gives a second answer that he prefers the local setting information 132 to the past setting information 180. When the button 420 is operated, the ECU 170 transmits a second answer signal indicating the second answer to the server 30 through the communication unit 155.

In this example, it is assumed that the server 30 transmits the inquiry signal to the vehicle 10-1, but it may also transmit the inquiry signal to the mobile terminal 5. In this case, a screen 405 is displayed on the display of the mobile terminal 5. The mobile terminal 5 transmits a first operation signal or a second operation signal to the server 30 depending on which of the buttons 415 and 420 is operated.

Figure 6:
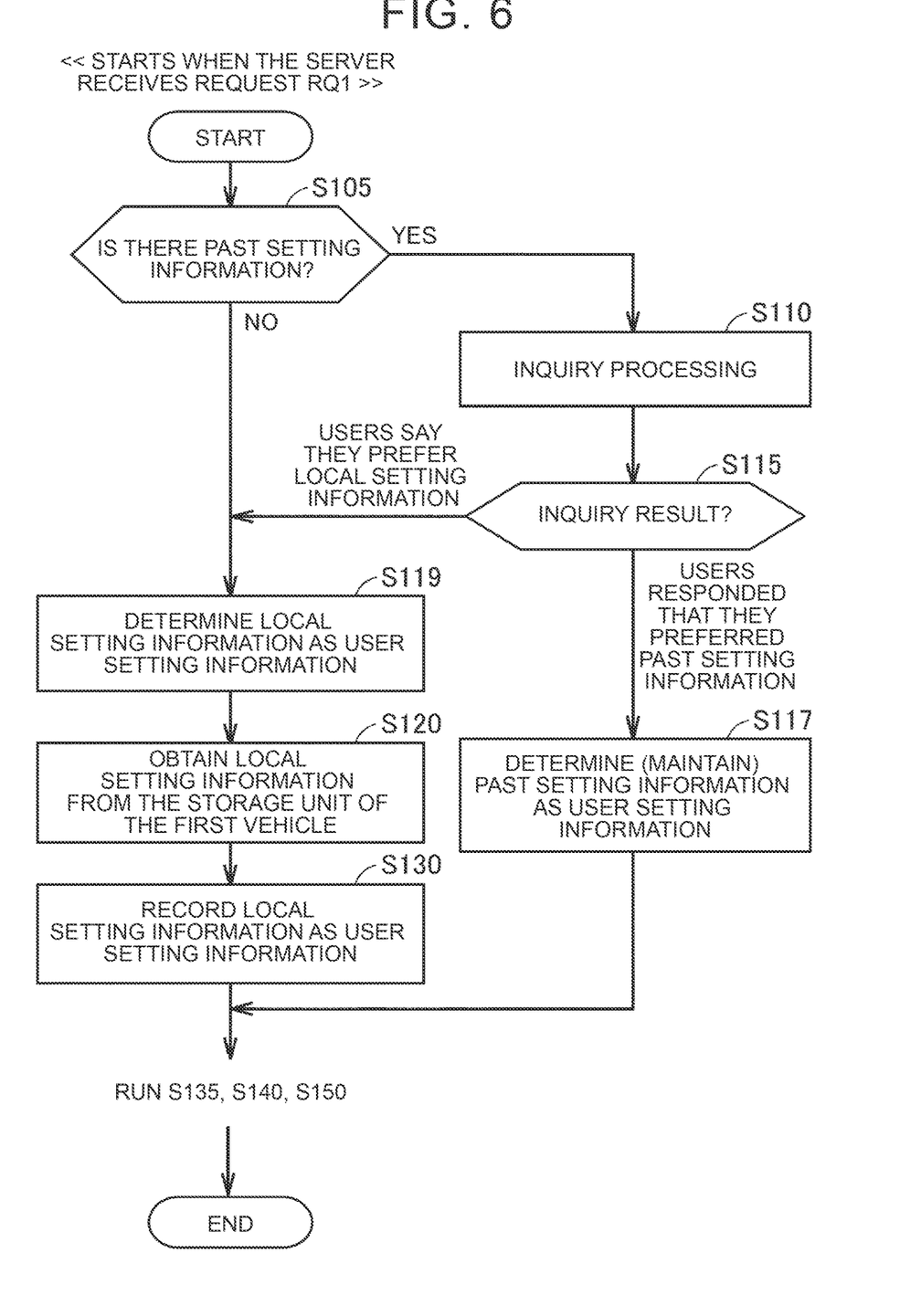
FIG. 6 is a flowchart illustrating processing executed by the server.

FIG. 6 is a flowchart illustrating a process executed by the server 30 (specifically, the processing device 320) according to the first modification. This flowchart differs from the flowchart of the embodiment (FIG. 3) in that S105, S110, S115, S117, and S119 are added, but is similar to the flowchart of FIG. 3 in other respects.

Referring to FIG. 6, server 30 determines whether past setting information 180 exists (S105). Specifically, the server 30 determines the user ID information 340 that corresponds to (for example, matches) the user ID information included in the request RQ1, and determines whether the number of times of use indicated by the information on number of times of use 349 related to the user ID information 340 is non-zero.

If there is no past setting information 180, that is, if the number of uses is zero (NO in S105), the process advances to S119. If past setting information 180 exists, that is, if the number of uses is non-zero (YES in S105), the process advances to S110.

The server 30 executes the inquiry process, specifically, transmits an inquiry signal to the vehicle 10-1 (S110), and switches the process according to the result of the inquiry process (S115).

As a result of the inquiry process, if the user U answers that he prefers the past setting information 180, that is, if the server 30 receives the first answer signal, the process proceeds to S117. The server 30 determines (maintains) the past setting information 180 as the user setting information 335 (S117).

If the user U answers that he prefers the local setting information 132, that is, if the server 30 receives the second answer signal, the process proceeds to S119. The server 30 determines the local setting information 132 as the user setting information 335 (S119). The server 30 acquires the local setting information 132 from the storage unit 130 of the vehicle 10-1 (S120), and then records the local setting information 132 as the user setting information 335 (S130). S130 corresponds to a process of overwriting the local setting information 132 over the past setting information 180 when the server 30 receives the second reply signal. After S117 or S130, the process proceeds to S135, S140, and S150.

According to this first modification, the user setting information 335 can be made more suitable.

Second Modification

In the embodiment and its first modification, the local setting information 132 (guest setting information 160) is acquired by the server 30 at the time of user registration of the vehicle 10, but it may also be acquired by the server 30 after user registration.

For example, user U may wish to record the above-mentioned default setting information as user setting information 335 at the time of user registration, and then record the local setting information 132 as user setting information 335 by overwriting the default setting information.

In this second modification, the HMI device 110 is configured to be able to display a button (not shown) that receives a user operation to instruct recording of the local setting information 132. When this button is operated, the ECU 170 can send a request to the server 30 to record the local setting information 132 as the user setting information 335 (in other words, to overwrite the local setting information 132 with the default setting information). In response to this request, the server 30 acquires the local setting information 132 from the storage unit 130 and executes the recording process. In this case, the request sent from ECU 170 to server 30 as described above corresponds to an example of the "first request" of the present disclosure. In this way, as long as the "first request" is a signal requesting to record the local setting information 132 as the user setting information 335 in the storage device 310, it can be sent to the server 30 either at the time of user registration or after user registration.

According to this second modification, the user U can record the local setting information 132 on the server 30 at any timing after user registration.

Modification Example 3

The storage unit 130 may further store an index value indicating the frequency of use of guest mode. This index value is, for example, the number of items in the guest setting information 160. The number of items is the number of types of information included in the guest setting information 160, such as audio setting information 143, temperature setting information 144, seat position information 145, and favorite spot information 147. The index value may be the number of favorite spots indicated in the favorite spot information 147, or may be a value indicating the cumulative length of time in which the guest mode has been set in the vehicle 10-1.

The server 30 (specifically, the processing device 320) acquires the index value from the storage unit 130 in response to the request RQ1 at the time of user registration, and executes the recording process if the index value is higher than the threshold value. The threshold value is stored in the storage device 310, for example.

The higher the index value is, the more likely it is that the user U has used the guest mode more frequently. In this case, guest setting information 160 is considered to be particularly suitable as user setting information 335. On the other hand, if the user U has not used the guest mode very often, the default setting information in the server 30 may be more suitable as the user setting information 335 than the guest setting information 160, for example. With the above configuration, the guest setting information 160 is recorded as the user setting information 335 when there is a high possibility that the user U has frequently used the guest mode of the vehicle 10-1. Thereby, the user setting information 335 can be appropriately determined according to the frequency of use of guest mode.

Other Embodiments

Although the request RQ1 is transmitted from the mobile terminal 5 to the server 30, it may also be transmitted from the vehicle 10-1 (ECU 170) to the server 30. Although the request RQ2 is transmitted from the vehicle 10-1 to the server 30, it may also be transmitted from the mobile terminal 5 to the server 30.

User authentication of the vehicle 10 may be performed using short-range communication between the user U's smart key (not shown) and the vehicle 10, or using a digital key.

Vehicle 10-1 does not need to have a guest mode. Even in this case, the local setting information 132 of the vehicle 10-1 is the same as the guest setting information 160 in that it is shared setting information that is locally set in the vehicle 10-1 for the device 101 of the vehicle 10-1. Therefore, each of the recording process, transmission process, inquiry process, and determination process can be applied to an example in which the vehicle 10-1 does not have a guest mode.

The server 30 synchronizes with the storage unit 130 and retrieves local setting information 132 from the storage unit 130 when the user U gets off the vehicle 10 (for example, the vehicle 10-1) or every predetermined time (for example, 30 minutes). (Guest setting information 160) may also be acquired. In this case, the server 30 updates the user setting information 335 according to the acquired local setting information 132. Thereby, even if the user U changes the local setting information 132 while using the vehicle 10-1, the latest local setting information 132 can be recorded as the user setting information 335. As a result, when the user U uses the user registered vehicle next time, the user U can start using the user registered vehicle under the user settings that reflect the user U's latest preferences.

In the embodiment, it is assumed that the vehicle type of vehicle 10-1 is the same as that of vehicle 10-2, but they may be different. When the seat position information 345 is set based on the vehicle type of the vehicle 10-1, when the user setting information 335 including this seat position information 345 is transmitted to the vehicle 10-2, the seat position indicated by the seat position information 345 is changed. There is also a possibility that the seat position of the vehicle 10-2 is not necessarily suitable. In this case, the server 30 transfers the seat position information 345 to the vehicle 10-2 according to the seat position information 345 using a map representing the correspondence between the seat position of the vehicle 10-1 and the seat position of the vehicle 10-2. It may be optimized (finely adjusted) to suit the vehicle 10-2, and information indicating the optimized seat position may be transmitted to the vehicle 10-2.

The embodiment disclosed herein should be considered to be exemplary and not restrictive in all respects. The scope of the present disclosure is indicated by the claims rather than the above description, and it is intended that all changes within the meaning and range equivalent to the claims are included.

What is claimed is:

1. A server that communicates with a plurality of vehicles including a first vehicle and a second vehicle, the server comprising:
    a storage device configured to store user setting information that is setting information for a device of each of the vehicles, the user setting information being associated with a user of the first vehicle; and
    a processing device configured to execute a recording process and a transmission process, wherein
    the first vehicle includes a storage unit that stores local setting information set in the first vehicle for a device of the first vehicle,
    the recording process includes a process of recording the local setting information as the user setting information in the storage device in response to a first request from the user, the first request being a request to register the user in the first vehicle and received at a time of user registration of the first vehicle, and
    the transmission process includes a process of transmitting the recorded user setting information to the second vehicle in response to a second request from the second vehicle.

2. The server according to claim 1, wherein:
    a mode of the first vehicle includes a user mode in which the user is authenticated in the first vehicle, and a guest mode in which the user is not authenticated in the first vehicle; and
    the local setting information includes guest setting information that is setting information of the device of the first vehicle in the guest mode.

3. The server according to claim 2, wherein:
    the storage unit further stores an index value indicating frequency of use of the guest mode; and
    the processing device executes the recording process when the index value is higher than a threshold value.

4. The server according to claim 2, wherein the guest setting information includes at least one of audio setting information indicating a set volume of an audio device, temperature setting information indicating a set temperature of an air conditioner, seat position information indicating a set position of a seat, and favorite spot information indicating a set position of a favorite spot of the first vehicle.

5. The server according to claim 4, wherein the local setting information is guest setting information that is set in the guest mode of the first vehicle by a guest user, the guest user being the user or a family member of the user.

6. The server according to claim 1, wherein:
    the storage device stores past setting information as the user setting information recorded before the local setting information is recorded;
    the processing device is configured to further execute an inquiry process and a determination process;
    the inquiry process includes a process of inquiring the user as to which of the local setting information or the past setting information is to be determined as the user setting information; and
    the determination process includes a process of determining either the local setting information or the past setting information as the user setting information according to a result of the inquiry process.

7. The server according to claim 1, wherein the local setting information includes at least one piece of information indicating a set volume of an audio device of the first vehicle, information indicating a set position of a favorite spot of the first vehicle, information indicating a history of a set position of a destination of the first vehicle, information indicating a set temperature of an air conditioner of the first vehicle, and information indicating a set position of a seat of the first vehicle.

8. The server according to claim 1, wherein, in response to the first request from the user, the server transmits an access token to the first vehicle, and the recording process is executed in response to the first request received.

9. The server according to claim 1, wherein the server is configured to transfer seat position information of the first vehicle to the second vehicle according to the seat position information using a correspondence between a seat position of the first vehicle and a seat position of the second vehicle, and to transmit information indicating the corresponding seat position to the second vehicle.

* * * * *